UNITED STATES PATENT OFFICE.

ARNOLD DANIEL, OF CHARLOTTENBURG, NEAR BERLIN, GERMANY, ASSIGNOR, BY MESNE ASSIGNMENTS, TO THE CHEMICAL FOUNDATION, INC., A CORPORATION OF DELAWARE.

PROCESS OF PURIFYING JUICES CONTAINING INULINE AND LAEVULOSE.

1,399,544.     Specification of Letters Patent.     Patented Dec. 6, 1921.

No Drawing.     Application filed April 10, 1918. Serial No. 227,818.

*To all whom it may concern:*

Be it known that I, ARNOLD DANIEL, engineer and chemist, a subject of the King of Rumania, residing at Charlottenburg, near Berlin, in the German Empire, have invented an improved and novel Process of Purifying Juices Containing Inuline and Laevulose, (for which I have filed applications in Germany, Sept. 18, 1916; in Austria, July 27, 1917; in Belgium, Aug. 9, 1917; in Hungary, Aug. 14, 1917; in Switzerland, Aug. 14, 1917; in Netherlands, Aug. 25, 1917; in Denmark, Aug. 25, 1917; in Great Britain, Sept. 18, 1917; and in Sweden, Jan. 23, 1918,) of which the following is a specification.

It is known that to extract inuline and laevulose from plants the plant juices are first purified either by heating or by adding neutrally reacting chemical substances or acids. A point to be paid attention to in one or the other of these treatments is either to segregate from the juices, before the crystallization of the inuline, the deleterious non-inuline substances (for instance albumins, dye-stuffs, and other troubling substances) present within the juice, or to convert them into an innoxious form, in order to facilitate the crystillization of the inuline, as well as to obtain it in pure state.

These processes do not allow of fully attaining the desired effect, and the subsequently extracted inuline must be repeatedly re-crystallized out of water. This re-crystallization renders the usual processes expensive and thus uneconomical.

I have discovered that the segregation of the non-inuline substances existing within the juices may be effected expeditiously by the addition of alkaline reacting bodies under the influence of heat. Particular care must, however, be taken that the solutions remain strongly alkaline, that is to say, the quantities of the alkaline additions ought to be chosen to such a limit of alkalinity that on further treatment of the juices with alkaline reacting bodies no precipitation takes place.

The alkaline reacting bodies by way of example may be carbonate of sodium, of potassium, and of ammonium; hydroxid of sodium, of potassium, and of ammonium; furthermore hydroxid of calcium, of strontium, of barium, and of magnesium; finally basic lead acetate.

Example: The juice squeezed or lixiviated out of the roots concerned (for instance dahlia roots) is heated for about $\frac{1}{2}$–$1\frac{1}{2}$ hours at a comparatively high temperature (for instance about 80° C.), with an addition during the heating of carbonate of sodium in excess. The quantity of the alkaline bodies concerned and the duration of the heating is to be determined according to the effect, that is to say, addition of carbonate of sodium and continuation of heating is to be carried on until, a filter test of the juice being made, another addition of said carbonate produces no further reaction and, consequently, no precipitation takes place.

Finally, the juice is filtered, perhaps after a preceding introduction of carbonic acid in order to remove deleterious substances such as, for example, compounds of barium calcium and strontium; then the purified juice is evaporated to let the inuline crystallize out of said juice, and ultimately the crystals obtained are washed, as usually.

This process renders a re-crystallization of the inuline unnecessary. At the same time the possibility is given to obtain from pure inuline also pure laevulose and the other products of decomposition of the inuline (for instance caramel and dextrin).

The non-inuline substances may be segregated also from solutions of raw inuline.

I claim:

1. The process of obtaining inuline from juices which comprises heating the juice for about $\frac{1}{2}$ to $1\frac{1}{2}$ hours at a temperature of about 80° C., adding an alkali belonging to the alkali metal group, during the heating and until an excess is shown, filtering and evaporating to crystallization.

2. The process of purifying juices containing inuline which comprises heating the juice for about $\frac{1}{2}$ to $1\frac{1}{2}$ hours at a temperature of about 80° C., adding an alkali belonging to the alkali metal group to said juice during the heating in an amount such that after removing a portion of the liquid and filtering, there is no further precipitation upon further addition of alkali, filtering and evaporating to crystallization.

3. The process of purifying juices containing inuline which comprises heating the juice for about ½ to 1½ hours at a temperature of about 80° C. adding sodium carbonate to said juice during the heating until an excess is shown, filtering and evaporating to crystallization.

4. The process of purifying juices containing inuline which comprises heating the juice for about ½ to 1½ hours at a temperature of about 80° C. adding sodium carbonate to said juice during the heating in an amount such that after removing a portion of the liquid and filtering, there is no further precipitation upon further addition of sodium carbonate, filtering and evaporating to crystallization.

In witness whereof I have hereunto set my hand.

ARNOLD DANIEL.